United States Patent
Shibata (12) 
(10) Patent No.: US 6,760,132 B1
(45) Date of Patent: Jul. 6, 2004

(54) IMAGE READING APPARATUS

(75) Inventor: Tetsuhiro Shibata, Hamamatsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/384,113

(22) Filed: Aug. 26, 1999

(30) Foreign Application Priority Data

Aug. 28, 1998 (JP) .......................................... 10-243850

(51) Int. Cl.$^7$ ................................................. H04N 1/04
(52) U.S. Cl. ...................... 358/488; 358/474; 358/497
(58) Field of Search .................................. 358/474, 471, 358/488, 497, 494, 401, 496, 505, 509, 484, 483, 482; 355/25; 399/362, 312; 250/234–236, 208.1; 382/319, 318; 348/96, 97

(56) References Cited

U.S. PATENT DOCUMENTS

| | | | |
|---|---|---|---|
| 4,708,461 A | * 11/1987 | Okuda et al. ................. | 399/87 |
| 5,107,279 A | * 4/1992 | Yamamoto et al. ......... | 347/251 |
| 5,220,436 A | * 6/1993 | Aosaki et al. ............... | 358/401 |
| 5,416,609 A | 5/1995 | Matsuda et al. ............. | 358/474 |
| 5,614,991 A | * 3/1997 | Moro et al. ................... | 355/75 |
| 5,616,914 A | 4/1997 | Matsuda ...................... | 250/208.1 |
| 5,659,404 A | 8/1997 | Matsuda ...................... | 358/474 |
| 5,764,379 A | 6/1998 | Matsuda et al. ............ | 358/474 |
| 5,808,756 A | * 9/1998 | Matsuda ...................... | 358/474 |
| 5,831,750 A | 11/1998 | Okisu et al. ................ | 358/493 |
| 5,835,241 A | * 11/1998 | Saund ......................... | 358/488 |

FOREIGN PATENT DOCUMENTS

| | | |
|---|---|---|
| JP | 04-287561 | * 10/1992 |
| JP | 10-178521 | 6/1998 |

OTHER PUBLICATIONS

Derwent–Account No. 2000–279717 "Image reader used in original document processing, detects shape of document based on ultrasonic wave received by ultrasonic sensor", Mar. 14, 2000.*

* cited by examiner

*Primary Examiner*—Cheukfan Lee
(74) *Attorney, Agent, or Firm*—Sidley Austin Brown & Wood LLP (57) ABSTRACT

An image reading apparatus optically reads a document, which is placed on a document platen facing upward, from above. The image reading apparatus has a ultrasonic sensor. A ultrasonic wave is emitted from the ultrasonic sensor toward the document placed on the document platen, and distance from the ultrasonic sensor to the document are detected based on the time differential of the reflected wave from the document. Furthermore, the position of the document can be detected based on the strength or weakness of the reflected wave from the document. In this way the shape of the document in the document height direction can be detected. Moreover, the shape of the document in the document height direction can be accurately detected regardless of the document color.

3 Claims, 9 Drawing Sheets

FIG. 9   Moving Direction of Ultrasonic Sensor

IMAGE READING APPARATUS

This application is based on Patent Application No. HEI 10243850 filed in Japan, the content of which is hereby incorporated by reference.

BACKGROUND OF THE INVENTION

1. Field of the Invention

The present invention relates to an image reading apparatus and specifically relates to art for detecting the shape of a document in an image reading apparatus of a type in which document are placed face upward.

2. Description of the Related Art

In conventional image reading apparatus of a type in which document are placed face upward, the shape of a document surface is detected using a sensor. The detection result is used to accomplish focus adjustment when reading the document, as well as curvature correction and condensation correction of the read document. The sensor for detecting the shape of the document in the height direction is a contact-type sensor, such that the sensor for document detection is provided on the document platen so as to detect the shape of a document in the height direction based on the coordinate position of a pin in contact with the document. Non-contact type sensors use a laser beam to detect the shape of a document in the height direction via a Doppler effect, or use a light source to illuminate the top edge of a document so as to detect the shape of the top edge of the document by reading the image of the top edge of the document reflected on a reflection member.

The image reading apparatuses of the aforesaid type which detect the shape of a document in the height direction by having a document detection pin come into contact with the document placed on the document platen are disadvantageous inasmuch as the document may be damaged by the document detection pin. Furthermore, in image reading apparatuses which detect the shape of a document in the document height direction using a laser beam, and image reading apparatuses which read the image of the top edge of a document illuminated by a document-illuminating light source via a reflection panel, there may be a detection error in detecting the shape of the document in the height direction depending on the color of the document because the shape of the document in the height direction is detected using light. Furthermore, the light may disadvantageously cause deterioration of them document.

Consideration has been given to not detecting the shape of a document in the height direction until the reading start instruction has been issued to prevent light-induced deterioration of the document, but in this case an operator cannot be alerted to the document placement direction on the document platen until a reading start instruction is issued.

OBJECTS AND SUMMARY

An object of the present invention is to provide an improved image reading apparatus which eliminates the aforesaid disadvantages.

Another object of the present invention is to provide an image reading apparatus capable of accurately detecting the shape of a document in the document height direction regardless of the color of the document.

Another object of the present invention is to provide an image reading apparatus capable of detecting the shape of a document in the document height direction without causing deterioration or damage to the document.

Yet another object of the present invention is to provide an image reading apparatus having improved operating characteristics by alerting an operator to an abnormal document placement condition before the reading start instructions are issued.

These objects are attained by providing an image reading apparatus for optically reading a document from above, said image reading apparatus comprising: a document platen for placing a document, an image sensing device for reading an image of a document placed on the document platen, and at least one ultrasonic sensor for emitting ultrasonic waves to a document placed on the document platen and detecting the shape of the document in the document height direction based on the reflected wave from the document.

In this construction, and ultrasonic wave is emitted from the ultrasonic sensor toward a document placed on the document platen, and the distance data from the ultrasonic sensor to the document are detected based on the time differential of the reflected wave from the document. Furthermore, the position of the document can be detected based on the strength or weakness of the reflected wave from the document. In this way the shape of the document in the document height direction can be detected without using light. Moreover, the shape of the document in the document height direction can be accurately detected regardless of the document color.

The shape of a document in the document height direction can be detected without causing deterioration or damage to the document by detecting the shape of a document in the document height direction using an ultrasonic sensor. In this way an operator can be alerted to an abnormal document placement conditions by detecting the shape of a document in the document height direction before the reading start instruction is issued.

The ultrasonic sensor may be rotated or moved to detect the shape of the document in the height direction. In this way the shape of a document in the document height direction can be accurately detected.

Furthermore, a plurality of stationary ultrasonic sensors may be provided so as to detect the shape of a document in the document height direction by switching the ultrasonic sensor used for detection. In this way the shape of a document in the document height direction can be accurately detected with the same effectiveness as rotating or moving the ultrasonic sensor.

BRIEF DESCRIPTION OF THE DRAWINGS

These and other objects and features of the present invention will become apparent from the following description of the preferred embodiments thereof taken in conjunction with the accompanying drawings, in which:

FIG. 5(*a*) shows the detection data of the document in the document height direction detected using the ultrasonic sensor;

FIG. 5(*b*) shows the detection data of the document in the document height direction detected using the ultrasonic sensor;

In the following description, like parts are designated by like reference numbers throughout the several drawings.

DETAILED DESCRIPTION OF THE PREFERRED EMBODIMENTS

[First Embodiment]

Figure 1:
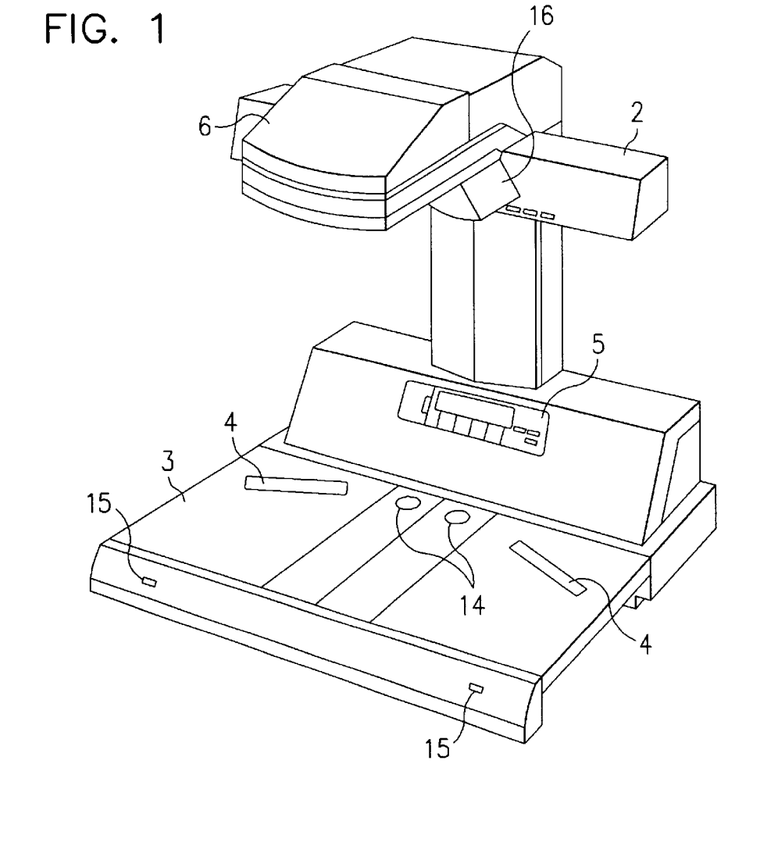
FIG. 1 is an external view of an image reading apparatus of a first embodiment.

FIG. 1 shows an external view of the image reading apparatus of the first embodiment. The image reading apparatus 1 is provided with a document platen 3 for face-upward placement of book documents such as bound documents and files and the like. An illumination unit 2 for illuminating a document is disposed above the interior side of the document platen 3. An operation panel 5 for setting the image reading conditions and the like is provided on the interior side of the document platen 3. A reading unit 6 for reading a document placed on the document platen 3 is provided internally above the operation panel 5. The image reading unit 6 is provided with a line sensor comprising a linear array of a plurality of image sensing elements, and an optical system for forming a image on the line sensor using the light from the document. The entire region of the document image is scanned by moving the line sensor in a direction perpendicular to the arrayed direction of the plurality of image sensing elements. On the document platen 3 are disposed start keys 4 for receiving the instruction to start reading a document, and a document sensor 14 for detecting a document placed on the document platen 3. Provided above the document platen 3 is an ultrasonic sensor 16 for emitting ultrasonic waves toward a document placed on the document platen 3, and detecting the shape of the document in the document height direction based on the reflected wave of the ultrasonic wave.

Figure 2:
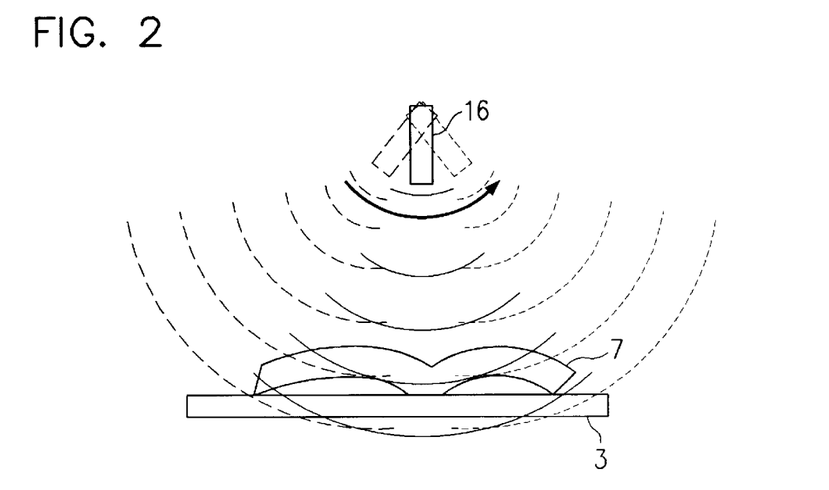
FIG. 2 illustrates the conditions of detecting the shape of a document in the document height direction using the ultrasonic sensor of the image forming apparatus.
Figure 3:
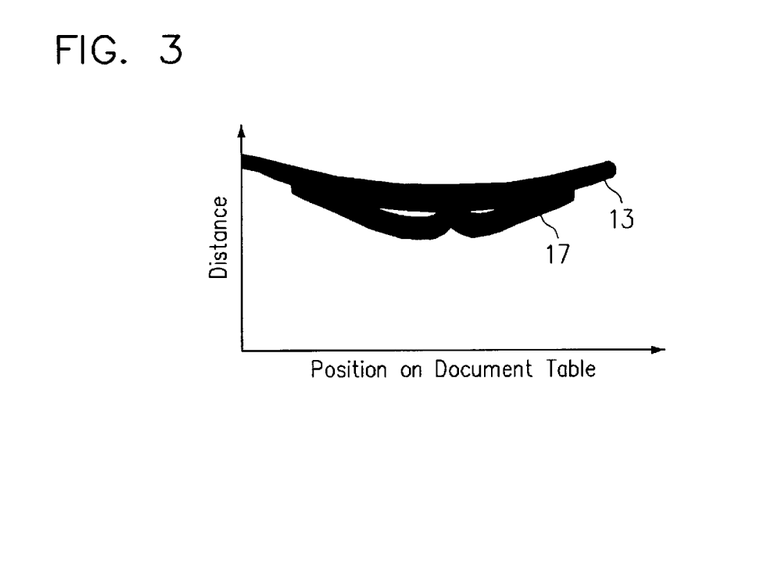
FIG. 3 shows the detection data of the document in the document height direction detected using the ultrasonic sensor.

The process for detecting the shape of a document in the document height direction using the ultrasonic sensor 16 is described below with reference to FIGS. 2 and 3. The ultrasonic sensor 16 is rotated in the arrow direction (identical to the scan direction of the line sensor) in FIG. 2, and ultrasonic waves are emitted from the emitter of the ultrasonic sensor 16 toward the book document and the document platen 3. The emitted ultrasonic waves are reflected by the book document and the document platen 3, and the reflected wave is received by the receiver of the ultrasonic sensor 16. The ultrasonic sensor 16 discriminates the difference between the frequencies of the signal wave and the echo wave, and detects the distance 17 from the ultrasonic sensor 16 to the book document 7, and the distance 13 from the ultrasonic sensor 16 to the document platen 3 using the Doppler effect, as shown in FIG. 3. At this time, a first reflected wave is used relative to the ultrasonic wave emitted from the emitter of the ultrasonic sensor 16 to detect the distance 17 to the book document 7, and a second reflected wave is used to detect the distance 13 to the document platen 3. The shape of the book document 7 in the document height direction can be detected by repeatedly executing the detection of these distances and synchronizing the rotational movement of the ultrasonic sensor 16. The height distribution of a document, and thus the size of the document, can be discriminated based on the aforesaid detection data. In addition, the finger position of the operator can be determined when an operator holds down the edges of the book document 7 with her fingers.

[Second Embodiment]

Figure 4:
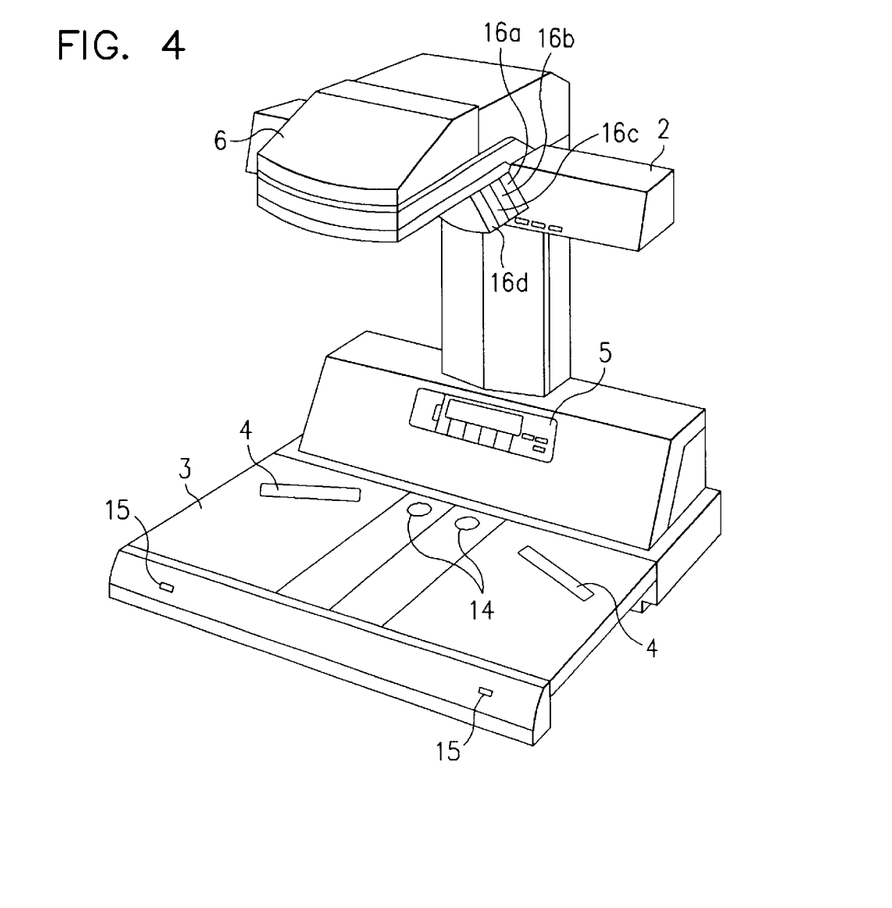
FIG. 4 is an external view of an image reading apparatus of a second embodiment.
Figure 5A:
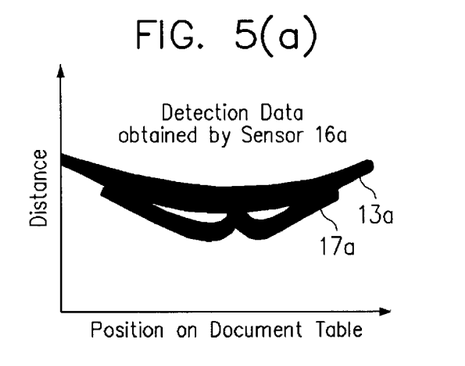
Figure 5B:
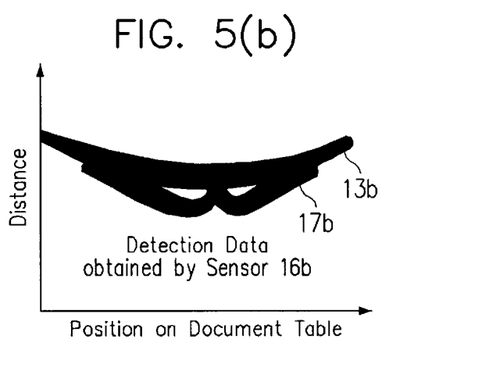
Figure 5C:
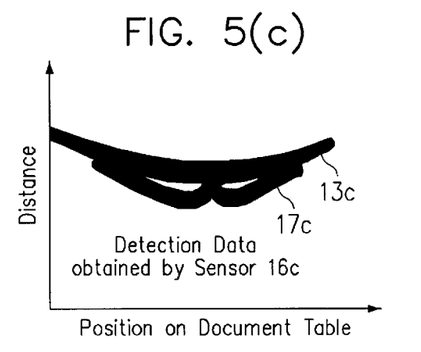
FIG. 5(c) shows the detection data of the document in the document height direction detected using the ultrasonic sensor.
Figure 5D:
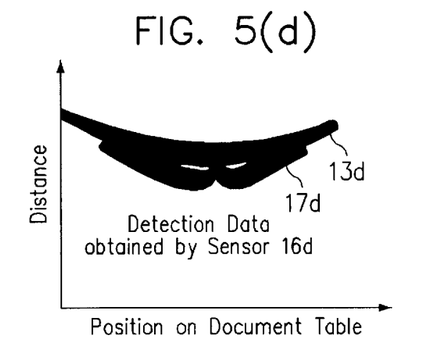
FIG. 5(d) shows the detection data of the document in the document height direction detected using the ultrasonic sensor.

The image reading apparatus of the second embodiment is described hereinafter with reference to FIGS. 4 and 5. In the first embodiment, the shape of a document in the document height direction is detected on a specific line using one ultrasonic sensor 16 which rotates in the subscan direction perpendicular to the array direction of the image sensing elements. In the second embodiment, the shape of a document in the document height direction is detected on a plurality of lines in the subscan direction at different positions in the array direction of the image sensing elements using four ultrasonic sensors 16a ~6d which rotate in the subscan direction. As shown in FIG. 4, the ultrasonic sensors 16a~6d are arranged in a row at different positions in the main scan direction below the image reading unit 6. The exposure positions of the ultrasonic waves of the respective sensors have the sensor 16a disposed on the most interior position of the document platen 3, and the sensors 16b~16d sequentially positioned toward the front side of the document platen 3. These ultrasonic sensors 16a~16d detect the shape of a document in the document height direction on a plurality of lines in the subscan direction by detecting the reflected waves, as shown in FIGS. 5(a)~5(d). In this case, as shown in FIGS. 5(a)~5(d), the distances 13a and 17a detected by the ultrasonic sensor 16a are the shortest, and the distances 13d and 17d detected by the ultrasonic sensor 16d are the longest. Furthermore, the ultrasonic sensor 16d confirms that the thickness is thicker than the book document 7 detected by the ultrasonic sensor 16a by detecting the angle of inclination relative to the book document 7.

[Third Embodiment]

Figure 6A:
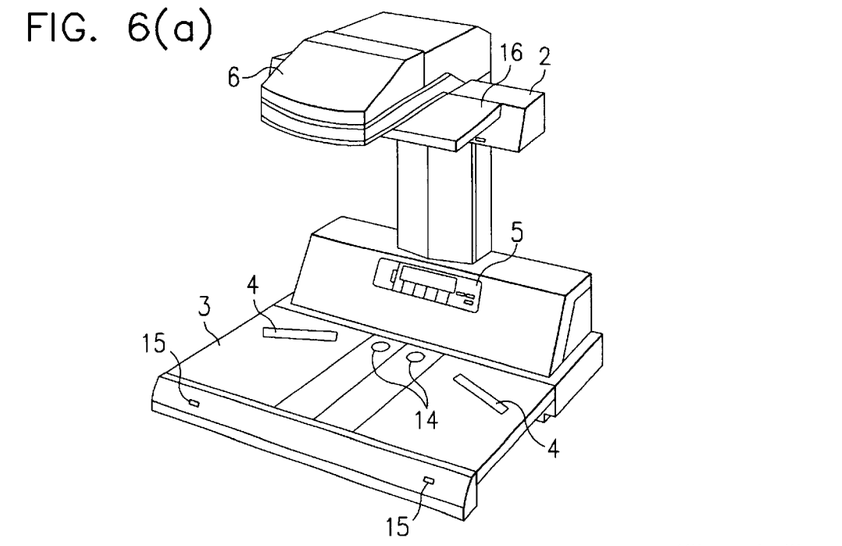
FIG. 6(a) is an external view of the image reading apparatus of a third embodiment.
Figure 6B:
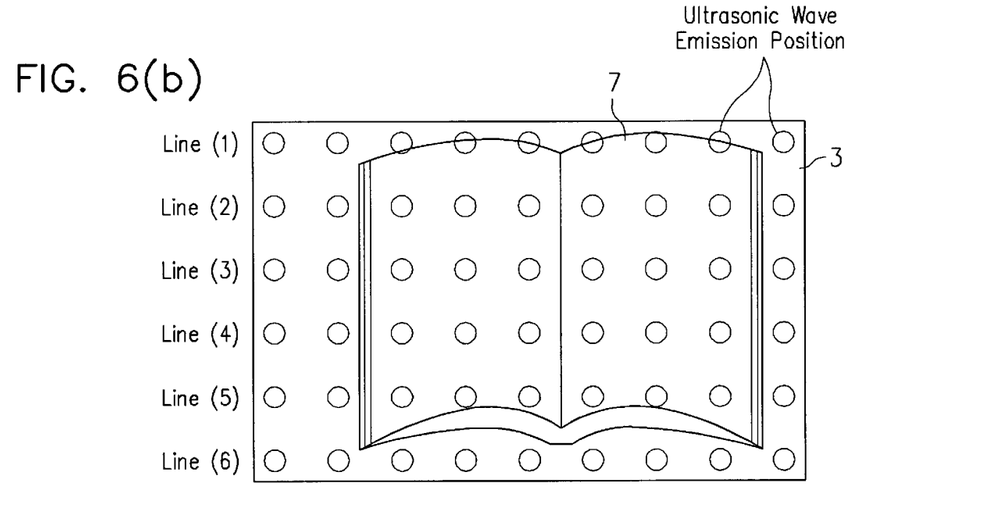
FIG. 6(b) is a plan view showing the ultrasonic wave emission position of the ultrasonic sensor.
Figure 6C:
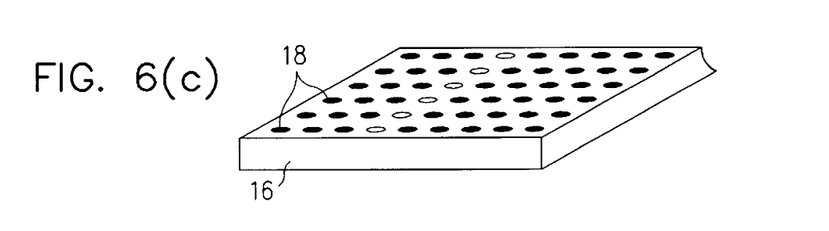
FIG. 6(c) is a perspective view of the ultrasonic sensor from below.
Figure 7A:
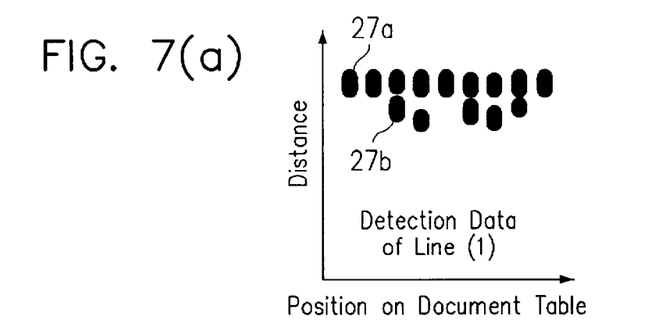
FIG. 7(a), FIG. 7(b) and FIG. 7(c) show the detection data of the document in the document height direction detected using the ultrasonic sensor.
Figure 7B:
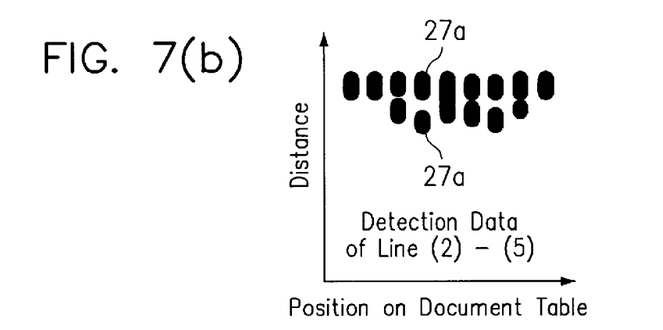
Figure 7C:
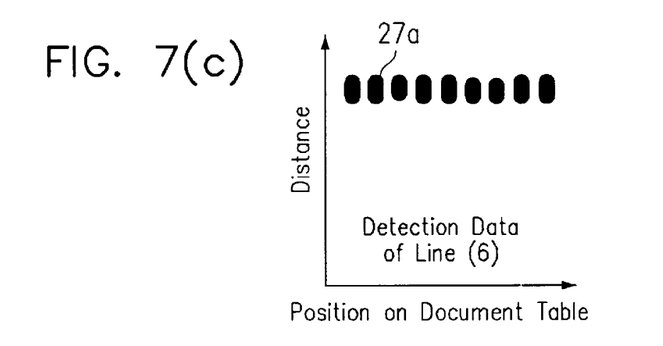

The image reading apparatus of a third embodiment is described hereinafter with reference to FIGS. 6(a), 6(b), 6(c) and FIGS. 7(a), 7(b), 7(c). In the previously described second embodiment, the shape of a document in the document height direction is detected on a plurality of lines extending in the subscan direction using four ultrasonic sensors 16a~16d which rotate in the subscan direction. In the third embodiment, the shape of a document in the document height direction is detected at a plurality of points dispersed throughout the entire region of the document using a plurality of stationary ultrasonic sensors. As shown in FIGS. 6(a), 6(b), 6(c), a plurality of ultrasonic sensor holes 18 are provided within the stationary ultrasonic sensor 16 disposed below the image reading unit 6, and the shape of a book document 7 in the document height direction is detected corresponding to each line (1)~(6), as shown in FIGS. 7(a), 7(b), 7(c), by switchably using the sensor holes 18 corresponding to the ultrasonic wave exposure position within each line (1)~(6). In distance measurement using ultrasonic waves, in addition to detecting the distance data using the time differential of the reflection waves, the hardness of a detection object can be detected using the strength/weakness of the reflected waves, and detection of a boundary line is possible. For example, in the case of the data for line (1) in FIG. 7(a), the reflected wave detected by the ultrasonic sensor hole 18 is classified as [strong] reflected wave data 27a and [weak] reflected wave data 27b. The [weak] reflected wave data 27b are reflection wave data from the area corresponding to the boundary of the book document 7, i.e., the so-called edge data. The shape of the entire plane of the book document 7 can be accurately confirmed by detecting the edge data.

[Fourth Embodiment]

Figure 8:
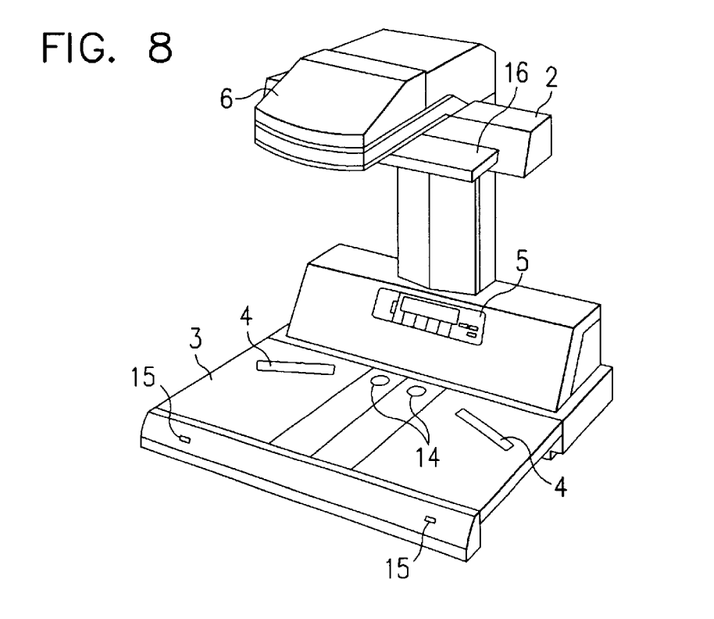
FIG. 8 is an external view of the image reading apparatus of a fourth embodiment.
Figure 9:
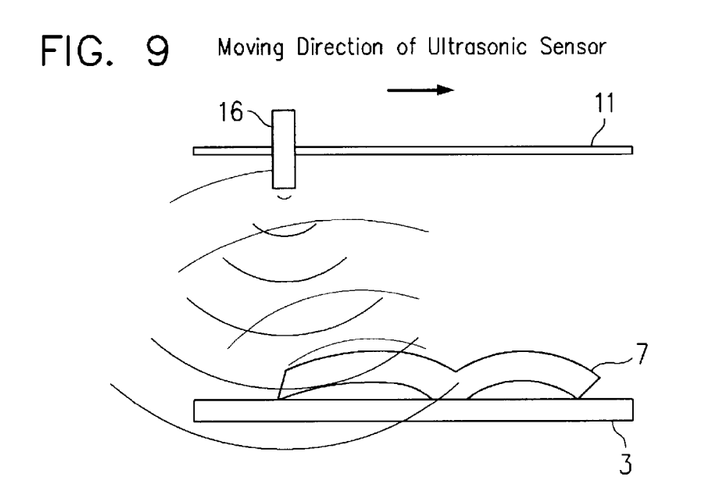
FIG. 9 illustrates the conditions of detecting the shape of a document in the document height direction using the ultrasonic sensor of the image forming apparatus.
Figure 10:
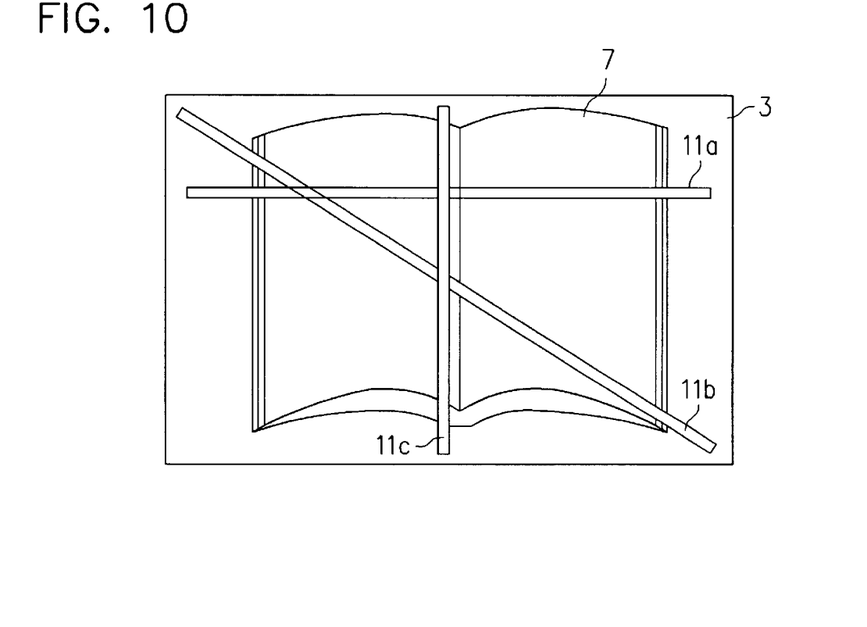
FIG. 10 illustrates the types of rails used to move the ultrasonic sensor of the image reading apparatus.

The image reading apparatus of a fourth embodiment is described hereinafter with reference to FIGS. 8 and 9. In the previously described third embodiment, the shape of a book document in the document height direction is detected using a plurality of stationary ultrasonic sensors. In the fourth embodiment, the shape of a book document 7 in the document height direction is detected by moving an ultrasonic sensor 16 comprising one or a plurality of sensors linearly parallel to the document platen 3, as shown in FIG. 9. The movement direction of the ultrasonic sensor 16 may be the subscan direction of the image sensing elements along the rail 11a, or may be an inclination direction relative to the document platen 3 along the rail 11b, as shown in FIG. 10. In addition to detecting the shape of the book document 7 in the document height direction by moving the ultrasonic sensor 16 along the rail 11b, it can also be determined whether the book document 7 is opened horizontally or opened vertically. As the ultrasonic sensor 16 is moved in the main scan direction of the image sensing elements along the rail 11c, the shape of the entire book document 7 in the document height direction can be accurately detected by rotating the ultrasonic sensor 16 in the subscan direction, and detecting the shape of the book document 7 in a lateral direction.

Figure 11:
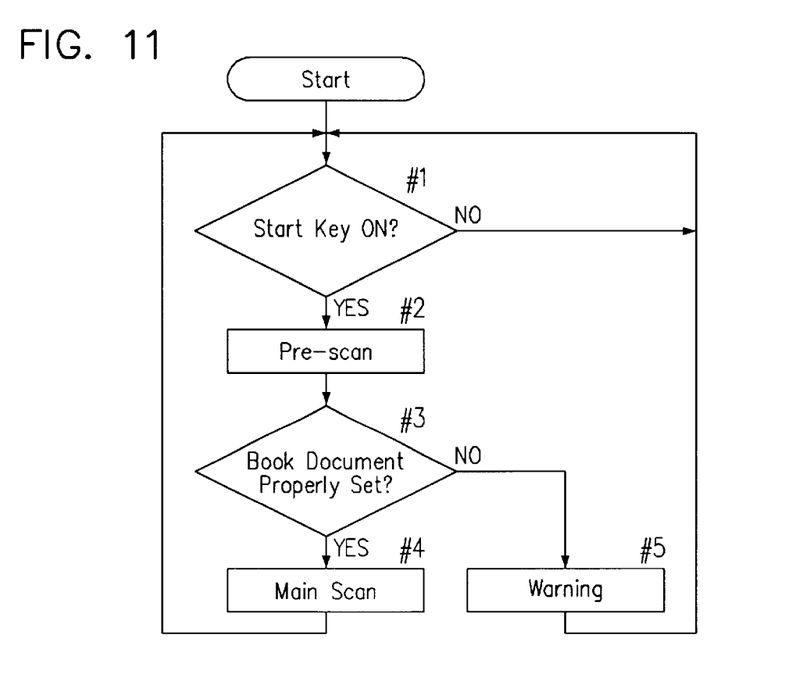
FIG. 11 is a flow chart of the control process of the image reading apparatus.
Figure 12:
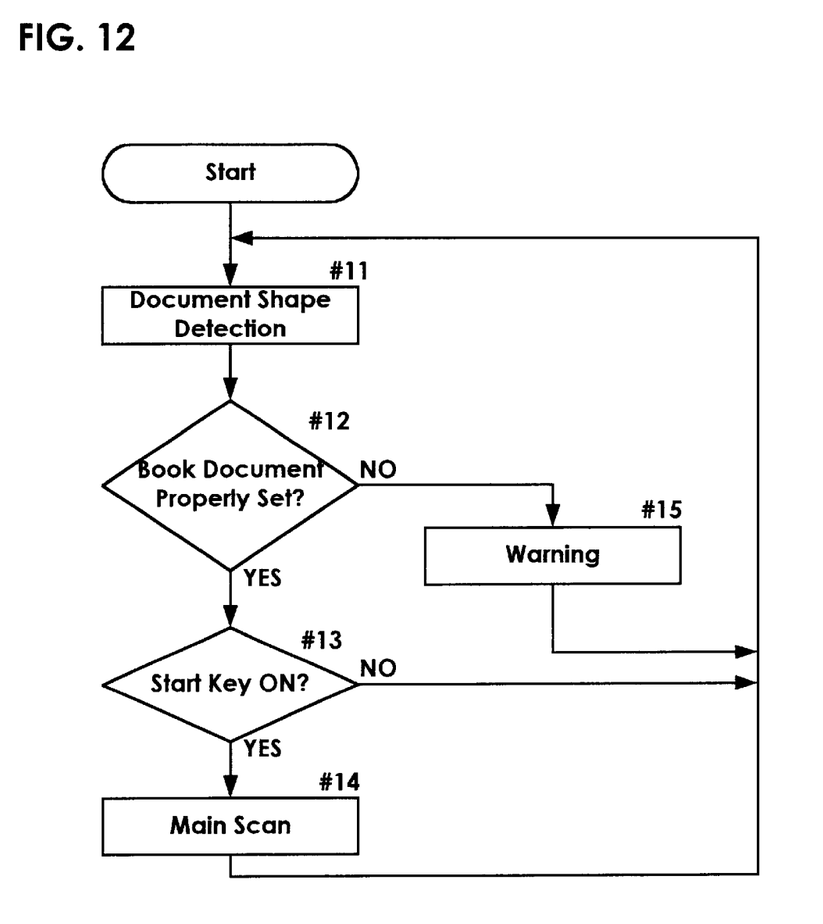
FIG. 12 is a flow chart of the control process for detecting improper placement of a book document.
Figure 13:
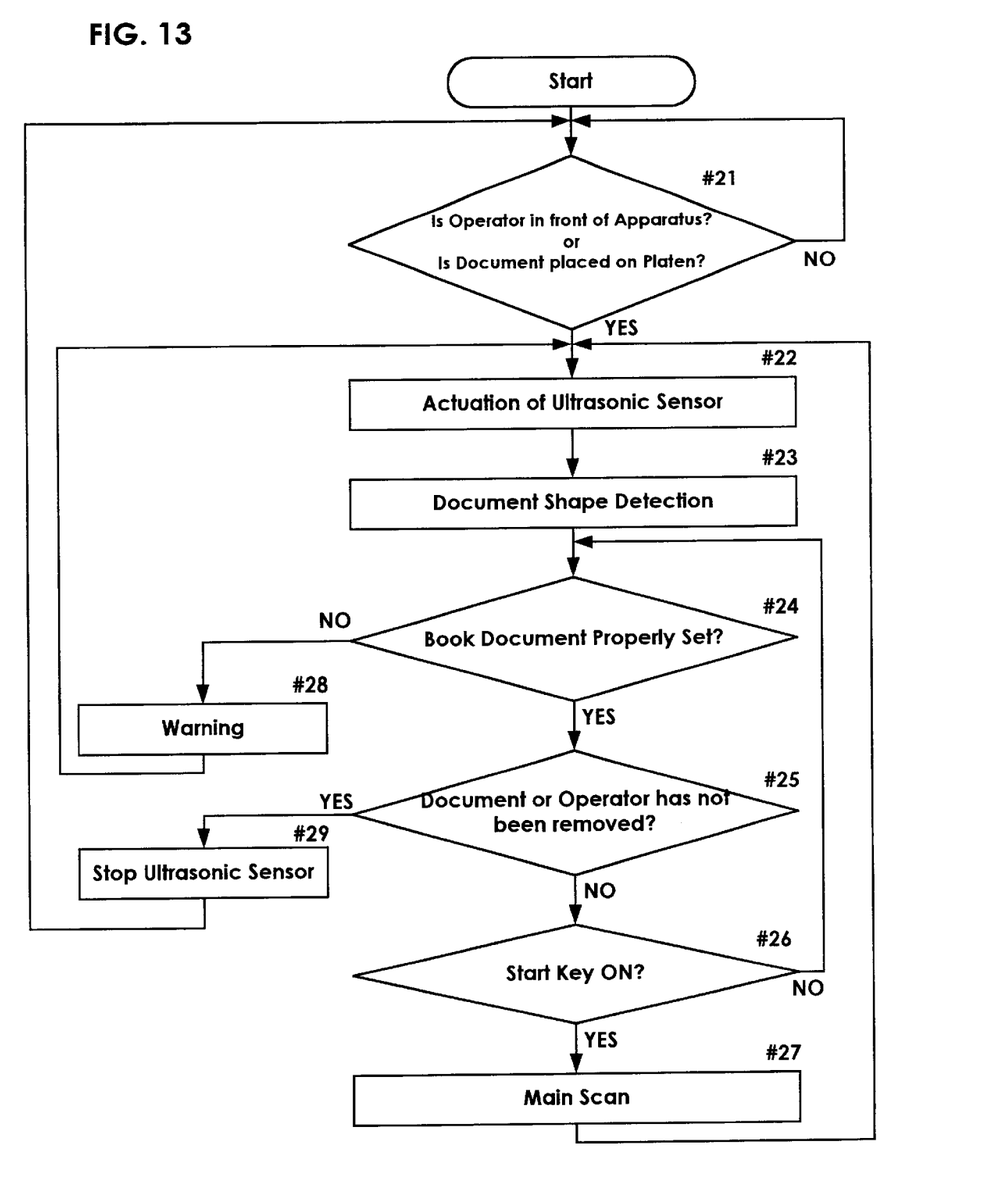
FIG. 13 is a flow chart of the control process for starting detecting of improper placement of a book document by an operator or after a document is detected.

The control process for the image reading apparatus 1 of the first through fourth embodiments is compared to the control process of a conventional image reading apparatus with reference to FIGS. 11 through 13. FIG. 11 is a flow chart of the control process of a conventional image reading apparatus. In a conventional image reading apparatus, when the start key is pressed (#1: YES), a pre-scan is executed (#2), and a determination is made as to whether or not the book document is properly set on the document platen 3 based on the document shape data detected in the pre-scan. If the book document has been properly placed on the document platen 3 (#3: YES), the main scan is performed (#4), whereas when the book document has not been properly set on the document platen 3 (#3: NO), a warning is issued indicating the improperly placement of the book document (#5), and the main scan is not performed. For this reason, the warning of improper placement of the book document cannot be issued until after the operator presses the start key and the image reading start command has been issued. This procedure is due to concern about deterioration of a book document through exposure to light and heat when normally detecting improper placement of a book document since conventional image reading apparatuses detect improper placement of a book document using light. In contrast, in the image reading apparatuses 1 of the first through the fourth embodiments of the present invention, improper placement of a book document 7 can normally be detected without causing deterioration of the book document 7 because the improper placement of the book document 7 is detected using the ultrasonic sensor 16.

FIG. 12 is a flow chart of the control process for detecting improper placement of a book document in the image reading apparatuses 1 of the first through the fourth embodiments. In this case, the book document 7 shape detection is started using the ultrasonic sensor 16 at the same time the image reading apparatus 1 is started (#11). At this time, the shape detection data for no document placed on the document platen 3 are pre-stored in memory. Then, when a book document 7 is placed on the document platen 3, the placement of the book document 7 is detected by comparison with the shape data when no document is placed on the document platen. Next, a check is made to determined whether or not a book document is properly placed on the document platen 3 (#12). When the book document has been properly placed (#12: YES), a check is made to determined whether or not the start key 4 has been pressed (#13). When the start key 4 has been pressed (#13: YES), the main scan is executed and the image of the document is read (#14). When the start key 4 has not been pressed (#13: NO), the routine returns to the process of step #11. When the placement of the book document 7 is improper (#12: NO), the document improper placement warning is issued (#15), and the routine returns to step #11 without performing the main scan. In this way improper placement of the book document 7 is normally detected and a warning indicating the improper placement of the book document 7 is issued before the operator issues the reading start instructions, thereby improving the operating characteristics compared to conventional image reading apparatuses.

FIG. 13 is a flow chart of the control process when improper document placement detection is started after an operator is detected or after detection of the book document 7 from the perspective of energy consumption in the image reading apparatuses 1 of the first through the fourth embodiments. In this case, the book document 7 or operator detection is started at the same time the image reading apparatus 1 is started using the document sensor 14 or the person sensor 15; when either the document sensor 14 or the person sensor 15 is turned ON, a book document 7 is presumed to be placed in the document platen 3 (#21: YES), the ultrasonic sensor 16 is actuated (#22), and the book document 7 shape detection is started (#23). Confirmation of whether or not a book document 7 is placed on the document platen 3 is accomplished by comparing shape data detected by the ultrasonic sensor 16 with the shape data detected previously when no document was set on the document platen in the same manner shown in FIG. 12.

The placement of a book document 7 on the document platen 3 can be confirmed based on the shape data detected in step #23 above. When proper placement of the book document 7 is confirmed (#24: YES), the book document 7 or the operator is detected using the document sensor 14 or the person sensor 15. When the detection value has not changed from the detection value of step #21, it is determined that the document or the operator has not been removed (#25: NO), and a check is made to determined whether or not the start key 4 has been pressed (#26). When the start key has been pressed (#26: YES), the focus adjustment of the taking lens and read image correction are accomplished based on the immediately previous shape data or the shape data is again detected, and the main scan is executed to read the document image (#27). When the start key 4 has not been pressed (#26: NO), the routine returns to the process of step #24. In contrast, when the book document 7 has been improperly placed (#24: NO), an improper document placement warning is issued (#28), and the process returns to step #22 without performing a main scan. When it is determined that the book document 7 has been removed from the document platen 3, or that the operator has moved from the front of the image reading apparatus 1 based on the detection result of the document sensor 14 or the person sensor 15 (#25: YES), the actuation of the ultrasonic sensor 16 is stopped (#29), and the routine returns to the process of step #22 without performing a main scan.

Since the shape of a book document can be detected without using light by using an ultrasonic sensor 16 as described above, the shape of a book document 7 can be accurately detected regardless of the color of the book document 7. Furthermore, the shape of a book document 7 can normally be detected without causing deterioration or damage to the book document 7 by detecting the shape of the book document 7 using the ultrasonic sensor 16. A warning can be issued indicating the improper placement of a book document 7 before specifying the start of the image reading operation based on the aforesaid detection result. Since, in this way, the operator can readjust the document placement position before specifying the start of the reading operation in accordance with the aforesaid warming, the operating characteristics of the apparatus are improved. The apparatus can also be realized in a more compact form factor because the reflection panel used in conventional apparatuses is unnecessary to detect the shape of the top edge of the document by reading the image of the top edge of the document.

The present invention is not limited to the previously described embodiments, and may be variously modified. For example, although a document sensor 14 is provided separately from the ultrasonic sensor 16 to detect a book document 7 place don the document platen 3 using the document sensor 14 in the previously described first through fourth embodiments, when the ultrasonic sensor 16 comprises a plurality of sensors as in the second embodiment, or when the image reading apparatus 1 is provided with a plurality of sensors 16a~16d as in the third embodiment, a book document 7 may be detected using a specific sensor among the plurality of sensors. In this way, since the document sensor 14 is unnecessary, the number of parts of the image reading apparatus 1 is reduced so as to reduce the manufacturing cost of the apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus for optically reading a document, said image reading comprising:

a document platen for placing a document;

an image sensing device for reading an image of the document placed on the document platen; and a detector for emitting ultrasonic waves to the document placed on said document platen and detecting a shape of the document in a document height direction based on a reflected wave from the document placed on said document platen;

wherein said detector includes an ultrasonic sensor which moves to detect the shape of the document in the height direction and wherein said ultrasonic sensor is rotatably mounted for detecting a shape of the document.

2. An image reading apparatus for optically reading a document, said image reading apparatus comprising:

a document platen for placing a document;

an image sensing device for reading an image of the document placed on the document platen; and a detector for emitting ultrasonic waves to the document placed on said document platen and detecting a shape of the document in a document height direction based on a reflected wave from the document placed on said document platen, said detector including a plurality of ultrasonic sensors;

wherein each of said ultrasonic sensors rotates to detect the shape of the document in the height direction.

3. An image reading apparatus for optically reading a document, said image reading apparatus comprising:

a document platen for placing a document;

an image sensing device for reading an image of the document placed on the document platen; and a detector for emitting ultrasonic waves to the document placed on said document platen and detecting a shape of the document in a document height direction based on a reflected wave from the document placed on said document platen, said detector including a plurality of ultrasonic sensors;

wherein said plurality of ultrasonic sensors are scattered throughout an entire area of the document platen.

* * * * *

UNITED STATES PATENT AND TRADEMARK OFFICE
CERTIFICATE OF CORRECTION

PATENT NO. : 6,760,132 B1
DATED : July 6, 2004
INVENTOR(S) : Tetsuhiro Shibata

It is certified that error appears in the above-identified patent and that said Letters Patent is hereby corrected as shown below:

Title page,
Item [57], ABSTRACT,
Line 3, delete "a" and insert -- an --.
Line 4, delete "A" and insert -- An --.
Line 10, after "way" insert -- , --.

Column 1,
Line 17, delete "document", and insert -- documents --.
Line 47, delete "them", and insert -- the --.
Line 48, after "given", insert -- as --.

Column 2,
Line 15, delete "and", and insert -- an --.
Line 21, after "way" insert -- , --.
Line 31, delete the second instance of "an".

Column 3,
Line 31, delete "detecting", and insert -- detection --.
Line 51, delete "a" and insert -- an --.

Column 5,
Line 61, delete "improperly", and insert -- improper --.

Column 6,
Lines 21 and 24, delete "determined", and insert -- determine --.
Line 33, after "way", insert -- , --.

Column 7,
Line 41, delete "place don", and insert -- placed on --.

UNITED STATES PATENT AND TRADEMARK OFFICE
CERTIFICATE OF CORRECTION

PATENT NO. : 6,760,132 B1
DATED : July 6, 2004
INVENTOR(S) : Tetsuhiro Shibata

It is certified that error appears in the above-identified patent and that said Letters Patent is hereby corrected as shown below:

<u>Column 8,</u>
Line 8, after "reading", insert -- apparatus --.

Signed and Sealed this

Thirtieth Day of November, 2004

JON W. DUDAS
*Director of the United States Patent and Trademark Office*